May 12, 1964     F. A. PONTIN     3,132,877
BICYCLE PROPULSION MEANS
Filed April 4, 1962
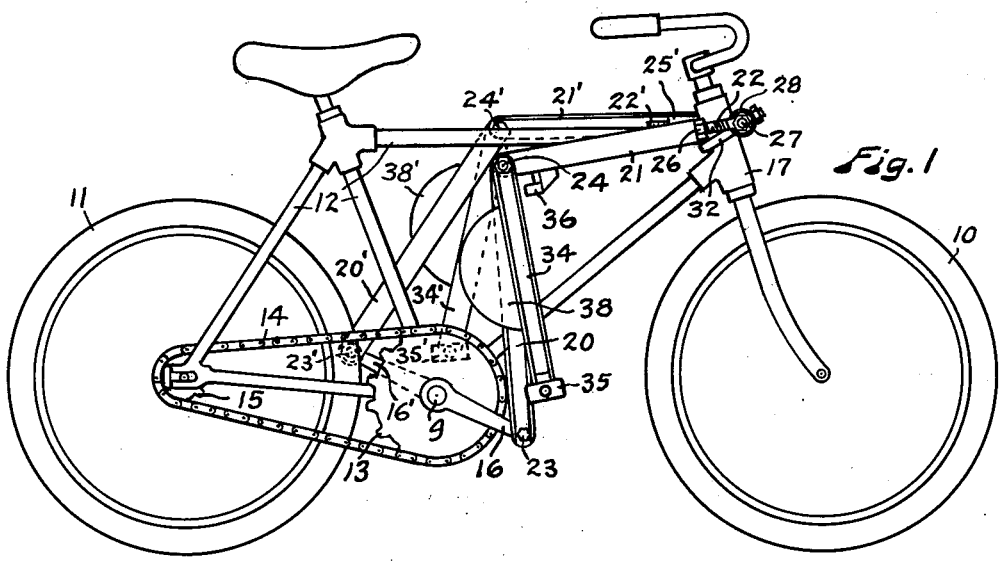
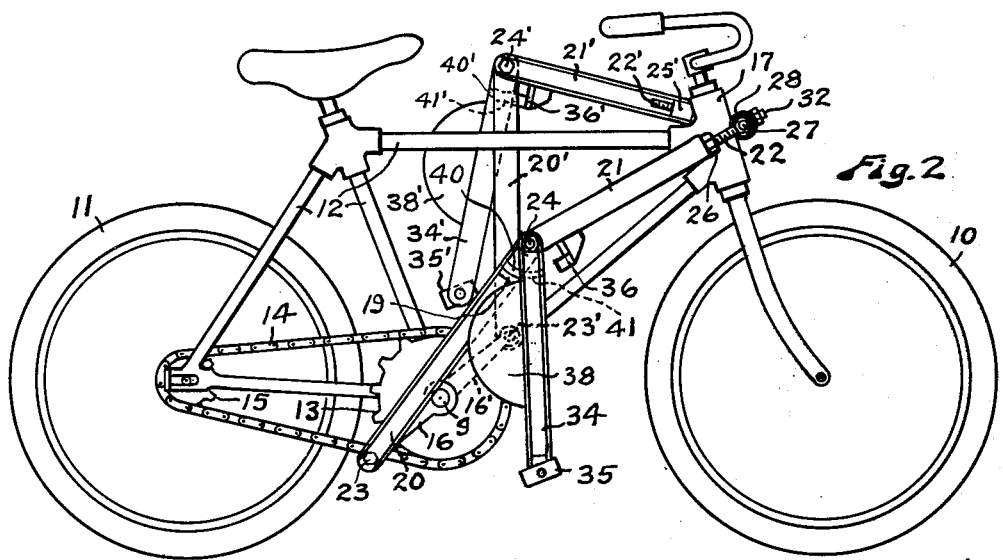
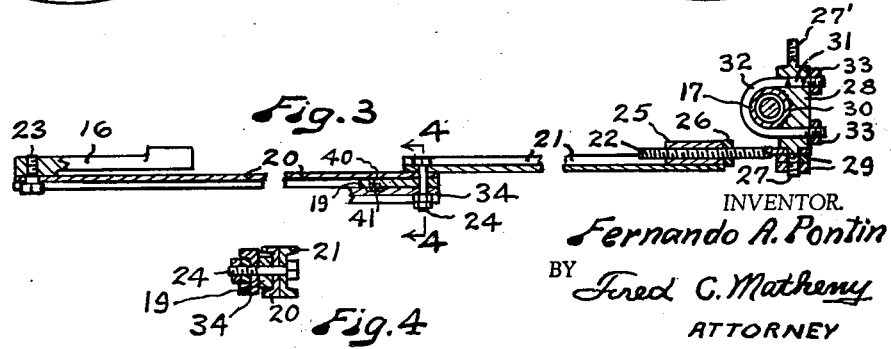
INVENTOR.
Fernando A. Pontin
BY Fred C. Matheny
ATTORNEY United States Patent Office 3,132,877
Patented May 12, 1964

3,132,877
BICYCLE PROPULSION MEANS
Fernando A. Pontin, 3234 S. Hudson St., Seattle 8, Wash.
Filed Apr. 4, 1962, Ser. No. 185,068
5 Claims. (Cl. 280—257)

My invention relates to bicycle propulsion means and an object of my invention is to provide mechanism which can be applied to an ordinary bicycle and connected with the pedal cranks of the same in such a manner as to provide a more advantageous application of foot power to said pedal cranks.

Another object is to provide propulsion devices for application to a bicycle in which the power is applied to the pedal cranks by means of toggle links, thereby providing for an increase in thrust on each pedal crank as the crank is approaching dead center and the effective lever arm through which the crank is applying driving power is decreasing, this increase in thrust being due to the action of the toggle links, which are straightening out or moving toward a position of alignment as the pedal crank approaches this position.

Other objects are to provide bicycle propulsion devices of this type which are simple in construction, not expensive to manufacture and easily applied to bicycles now in common use.

Further objects will be apparent from the following description taken in connection with the accompanying drawings.

In the drawings, FIGURE 1 is a side elevation of a bicycle equipped with my bicycle propulsion means showing the toggle links on both sides of the bicycle in an approximately mid position in their cycle.

FIG. 2 is a similar view showing the toggle links on the right or near side of the bicycle in a position in which they are nearest to alignment with each other and the toggle links on the left or far side of the bicycle in near their uppermost position in which they are almost at right angles to each other.

FIG. 3 is a view partly in section and partly in plan and with parts broken away showing a pair of toggle links together with means connecting them with each other and with the front end portion of a bicycle frame and with a pedal crank arm of the bicycle.

FIG. 4 is a fragmentary sectional view, on a larger scale than FIG. 3 taken substantially on broken line 4—4 of FIG. 3.

Like reference numerals refer to like parts throughout the several views.

The drawings show a bicycle of conventional construction having a front wheel 10, a rear wheel 11, a frame 12 and a large sprocket wheel 13 on a pedal crank shaft 9. The sprocket wheel 13 is connected by a sprocket chain 14 with a smaller sprocket wheel 15 on the rear wheel 11 of the bicycle. The shaft 9 which carries the large sprocket wheel 13 has pedal crank arms 16 and 16' connected with it in the usual manner for driving purposes. The usual upright tubular steering post frame or housing 17 is provided at the front end of the bicycle frame.

In accordance with my invention I provide two sets of toggle links for use at the respective sides of the bicycle frame. These two sets of toggle links are duplicates except that in certain features they are made left and right. A description of the toggle links at the right or near side of the bicycle shown in FIGS. 1 and 2 will apply equally well to those at the other or left side. Primed numbers are used to designate parts at the left which correspond to parts at the right designated by similar unprimed numbers. The set of toggle links shown at the right side of the bicycle in FIGS. 1 and 2 comprises a rear link 20 and a forward link formed of two parts 21 and 22, the forward link being of two part construction to make it adjustable in length. The rear end of the rear link 20 is pivotally connected with the outer end of the pedal crank 16 by a pivot member 23, which may be a shoulder bolt, FIG. 3. The adjoining ends of the two links 20 and 21, 22 are connected with each other by a suitable pivot bolt or member 24. Preferably each link 20 and 21 is formed of material of channel shaped cross section, as illustrated in FIG. 4, to provide greater resistance to sidewise bending. The forward end portion 22 of the forward toggle link of each pair can be an externally threaded rod of eye bolt form which threads through a block 25 that is rigidly secured to the upper end portion of the forward link part 21. Preferably a lock nut 26 is provided on the rod 22 to jam against the block 25 and eliminate danger of lost motion. The forward end of the rod 22 is pivotally mounted on a fixed stud 27 on the end of a short transverse mounting bar 28. Two nuts 29 in jammed and locked relation can be used on the stud 27 to secure the link member 22 on said stud 27 and leave it free to move pivotally. The mounting bar 28 has an arcuate transverse notch 30 in its inner side midway between its two ends to receive and fit partly around the steering post housing 17 of the bicycle frame. Preferably the wall of the notch 30 is vertically scored to provide therein fine ribs which cause the mounting bar to more firmly engage with the steering post housing 17. Two transverse holes 31 are provided in the mounting bar 28 adjacent the opposite edges of the notch 30 to receive the arms of a U shaped yoke 32 which fits around the steering post housing 17. Nuts 33 on the arms of the yoke 32 securely clamp the mounting bar 28 to the steering post housing 17.

A pedal arm 34 is swingingly mounted on the bolt 24 which pivotally connects the two ends of the links 20 and 21 and hangs downwardly therefrom. Preferably a filler block 19 is welded or rigidly secured to the channel shaped link 20 at the location of the bolt 24 to help provide a better pivotal connection for the pedal arm 34. A pedal 35 is provided on the lowermost end of the pedal arm 34. Preferably a stop member 36 is secured to the link 21 near the pivot 24 and extends transversely far enough to be in the path of swinging movement of the pedal arm 34 without interfering with movement of the link 20, to limit forward swinging movement of said pedal arm. To oppose the tendency of the pedal arm 34 to swing inwardly when downward pressure is exerted on the pedal 35 and to minimize rubbing friction between arm 34 and link 20, I provide two opposed friction plates 40 and 41, FIGS. 2 and 3, carried respectively by link 20 and pedal arm 34 and positioned between these parts near pivot bolt 24 so they are in rubbing contact with each other. Plates 40 and 41 can be formed of low friction nylon plastic.

Also preferably a guard member 38 is secured to the pedal arm 34 near its upper end and extends rearwardly therefrom over a part of the rear link 20 to prevent a leg portion of the trousers worn by a person riding the bicycle from becoming caught between the link 20 and pedal arm 34.

The parts of the toggle link structure on the left side of the bicycle frame, except for being "left" instead of "right" where required, are similar to the just described parts on the right side of said frame and operate in a similar manner and are designated by primed numbers which, except for their prime signs, are the same as the numbers applied to the parts at the right.

The adjustment in length provided in the forward link 21, 22 makes possible the use of my toggle link assembly on bicycles of varying dimension. The threaded connection between the two parts 21 and 22 of the forward toggle link makes possible a fine adjustment of the effective length of this link as may be desired by different users. Obviously, this adjustment in length of one of the links may be dispensed with in instances where the toggle link assembly is made for use on a bicycle of predetermined known dimensions. In applying the toggle link assembly to a bicycle the length of the forward link is preferably adjusted so that the medial pivot member 24, when at its lowermost point, as shown in FIG. 2, is fairly close to but cannot "pass center" by being moved downwardly across a straight line which passes through the axis of the foremost pivot member 27 and the pedal crank shaft 9 of the bicycle. Thus the toggle links at both sides always operate above a plane common to the axis of the steering post pivots 27, 27' and the axis of the pedal crank shaft 9 and are restrained from passing below this plane.

In the operation of this toggle link propulsion means, the rider propels the bicycle in about the usual manner but he has more freedom of leg movement than is afforded by the usual bicycle propulsion means and the feet are not required to follow a true circle and the legs do not have to be moved as far in forward and rear directions but the feet can move more nearly in an oval or elliptical path which has its major axis approximately upright. In the usual bicycle propulsion means, a pedal would be directly on the outer end of the pedal crank 16 and driving power would be inefficiently applied throughout the lower portion of the pedal crank travel and after the pedal crank 16 has passed the approximate position in which it is shown in FIG. 1. With my toggle link assembly the power or thrust which is applied to the pivot member 24 after the pedal crank 16, in moving clockwise, passes this position is efficiently applied in this lower portion of the pedal crank travel, and during this portion of the travel the toggle links are straightening out or approaching alignment and thus provide increasing thrust as the effective lever arm through which the thrust is applied by pedal crank 16 to the shaft 9 is decreasing.

The foregoing description and accompanying drawings clearly disclose a preferred embodiment of my invention but it will be understood that this disclosure is merely illustrative and that changes may be made within the scope of the following claims.

I claim:

1. In bicycle driving means, the combination with a bicycle having the usual frame and pedal cranks and pedal crank shaft and steering post housing, of two pairs of toggle links positioned adjacent the respective sides of the bicycle frame, each pair of links comprising a rear link and a forward link having adjoining ends connected by a common pivot, the rear end of the rear link of each pair being pivoted to the outer end of one of the pedal cranks of the bicycle; means pivotally connecting the forward end of the forward toggle link of each pair with the steering post housing of the bicycle, the combined length of the two links of each pair being slightly greater than the maximum possible distance between the center of the steering post housing pivot and the crank arm pivot of the pair, said links operating above and being restrained from passing below a plane common to the axes of the steering post housing pivot and the pivot connecting the rear link to its pedal crank; a pedal arm suspended from the common pivot of each pair of toggle links; a pedal carried by the lowermost end of each pedal arm; and toggle link length-adjusting means embodied in at least one toggle link of each pair.

2. The apparatus as claimed in claim 1 in which stop means is provided limiting forward swinging movement of each pedal arm about the common pivot which connects the pedal arm with the pair of toggle links.

3. In bicycle driving means, the combination with a bicycle having the usual frame and pedal cranks and steering post housing, of two pairs of toggle links positioned adjacent the respective sides of the bicycle frame, each pair of links comprising a rear link and a forward link having adjoining ends connected by a common pivot, the rear end of the rear link of each pair being pivoted to the outer end of one of the pedal cranks of the bicycle; a U-shaped clamp member extending around the bicycle steering post housing; a mounting bar extending transversely across the front side of said steering post housing and rigidly clamped to said steering post housing by said U-shaped clamp member; pivot means carried by each end of said mounting bar receiving and pivotally supporting the forward end of the forward toggle link of one pair of said links, the combined length of the two links of each pair being slightly greater than the maximum possible distance between the center of the pivot means at the forward end of the forward toggle links and the crank arm pivot of the rear link of the pair, said links operating above and being restrained from passing below a plane common to the pivots carried by said mounting bar and the axis of the pivot connecting the rear link to its pedal crank; a pedal arm suspended from the common pivot of each pair of toggle links; and a pedal carried by the lowermost end of each pedal arm.

4. In bicycle driving means, the combination with a bicycle having the usual frame and pedal cranks and pedal crank shaft and steering post housing, of two pairs of toggle links positioned adjacent the respective sides of the bicycle frame, each pair of links comprising a rear link and a forward link having adjoining ends connected by a common pivot, the rear end of the rear link of each pair being pivoted to the outer end of one of the pedal cranks of the bicycle; means pivotally connecting the forward end of the forward toggle link of each pair with the steering post housing of the bicycle, the combined length of the two links of each pair being slightly greater than the maximum possible distance between the centers of the steering post housing pivot and the crank arm pivot of the pair, said links operating above and being restrained from passing below a plane common to the axes of the steering post housing pivot and the pivot connecting the rear link to its pedal crank; a pedal arm suspended from the common pivot of each pair of toggle links; a pedal carried by the lowermost end of each pedal arm; and two opposed friction plates of low friction material positioned for rubbing contact between each rear link and the adjacent pedal arm near said common pivot, one plate of each pair being secured to a rear toggle link and the other plate being secured to the adjacent pedal arm.

5. In bicycle driving means, the combination with a bicycle having the usual frame and pedal cranks and pedal crank shaft and steering post housing, of two pairs of toggle links positioned adjacent the respective sides of the bicycle frame, each pair of links comprising a rear link and a forward link having adjoining ends connected by a common pivot, the rear end of the rear link of each pair being pivoted to the outer end of one of the pedal cranks of the bicycle; means pivotally connecting the forward end of the forward toggle link of each pair with the steering post housing of the bicycle, the combined length of the two links of each pair being slightly greater than the maximum possible distance between the steering post housing pivot and the pedal crank pivot of the pair, said links operating above and being restrained from passing below a plane common to the axes of the steering post housing pivot and the pivot connecting the rear link to its crank arm; a pedal arm suspended from the common pivot of each pair of toggle links; a pedal carried by the lowermost end of each pedal arm; and a guard plate secured to each pedal arm and extending over an adjacent rearmost toggle link.

References Cited in the file of this patent

UNITED STATES PATENTS

| | | |
|---|---|---|
| 540,139 | Bowell | May 28, 1895 |
| 766,010 | Zelenka | July 26, 1904 |
| 2,933,942 | Boylan et al. | Apr. 26, 1960 |
| 3,010,733 | Melton et al. | Nov. 28, 1961 |

FOREIGN PATENTS

| | | |
|---|---|---|
| 83,417 | Switzerland | Dec. 1, 1919 |
| 212 | Great Britain | 1899 |